United States Patent [19]
Kamagai

[11] Patent Number: 6,027,353
[45] Date of Patent: Feb. 22, 2000

[54] CONNECTOR

[75] Inventor: Izuru Kamagai, Kawasaki, Japan

[73] Assignee: Thomas & Betts Corporation, Memphis, Tenn.

[21] Appl. No.: 08/757,363

[22] Filed: Nov. 27, 1996

[30] Foreign Application Priority Data

Dec. 1, 1995 [JP] Japan ............................ 7-012737 UM

[51] Int. Cl.⁷ .................................................. H01R 9/09
[52] U.S. Cl. ............................................................. 439/224
[58] Field of Search .................................. 439/660, 682, 439/78, 31, 924.1, 224

[56] References Cited

U.S. PATENT DOCUMENTS

| | | | |
|---|---|---|---|
| 4,655,522 | 4/1987 | Beck, Jr. et al. | 439/224 |
| 4,657,320 | 4/1987 | Bamford et al. | 439/596 |

*Primary Examiner*—Neil Abrams
*Assistant Examiner*—Barry M. L. Standig
*Attorney, Agent, or Firm*—Hoffman & Baron, LLP

[57] ABSTRACT

A connector comprises a header and where multiple contacts are mounted in such a manner as to extend to the respective post part of the contacts and a socket where multiple contacts for electrically connecting to respective post parts of the header are mounted. The socket further has multiple guide grooves to receive the post part of the header at the corresponding contacts of the socket. The housing of the guide grooves are stretched to adjoining three planes of the housing.

6 Claims, 5 Drawing Sheets

CONNECTOR

FIELD OF THE INVENTION

The present invention relates to connectors, particularly connectors for connecting battery units.

BACKGROUND OF THE INVENTION

In this type of connector, the inserting direction is generally pre-fixed when male and female connectors are fitted in. However, in the case when a female connector, for instance, is set up at a battery unit, the insertion (easy insertion) direction of the female connector onto a male connector varies with the size and shape of the battery or arrangement of the battery. In this case, conventional connectors, in which the inserting direction is fixed, cannot be used.

SUMMARY OF THE INVENTION

The present invention was developed to solve the above-mentioned problem, and its objective is to furnish connectors in which the insertion direction is not restricted.

To achieve the objective, the present invention furnishes a connector comprising a header where multiple contacts are mounted in such a manner to stretch out the respective post parts of the contacts and a socket where multiple contacts for electrically connecting to the respective post parts of the header are mounted, and the socket has a housing having a nearly rectangular section and multiple guide grooves to receive and guide the post parts of the header to corresponding contacts of the socket; moreover, the guide grooves are extended to the adjoining three planes of the housing.

BRIEF DESCRIPTION OF THE DRAWING FIGURES

DETAILED DESCRIPTION OF THE PREFERRED EMBODIMENT(S)

Hereinafter, the present invention is explained by application examples with the figures.

FIGS. 1–5 show headers 10 of connectors of the present invention. The header comprises a housing 10A and multiple contacts 11–12 having elongated post parts, which are mounted at fixed intervals along the longitudinal direction of the housing. The contacts consist of post parts 11A, 12A, leg parts 11C, 12C and parts connecting the post parts and the leg parts (not shown in the figures).

Figure 1:
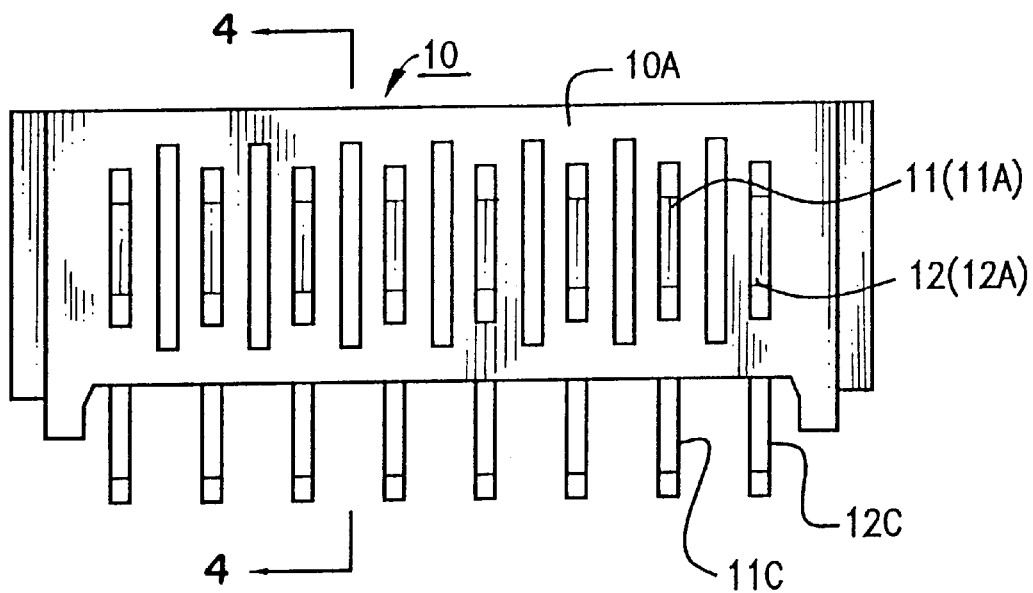
FIG. 1 is a front view of a header of a connector in an application example of the present invention.
Figure 2:
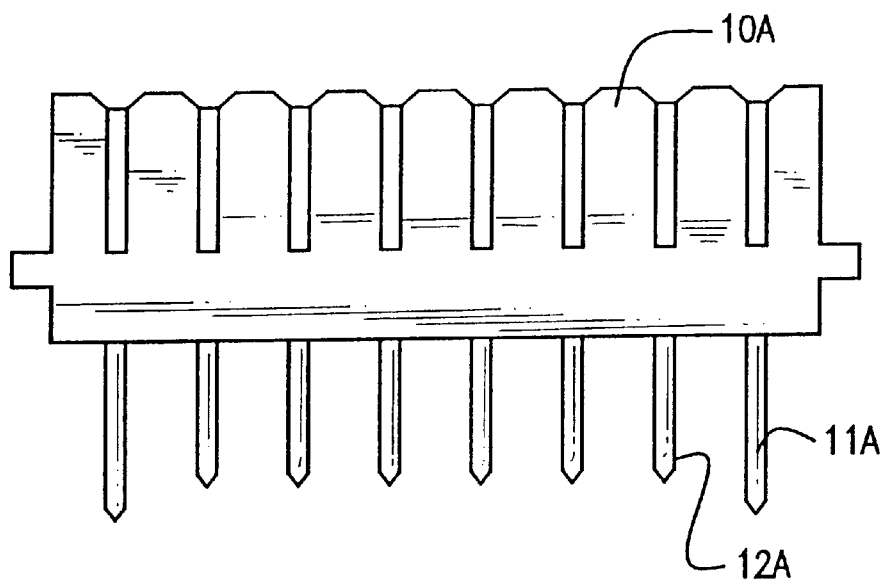
FIG. 2 is a plan view of the header in FIG. 1.
Figure 3:
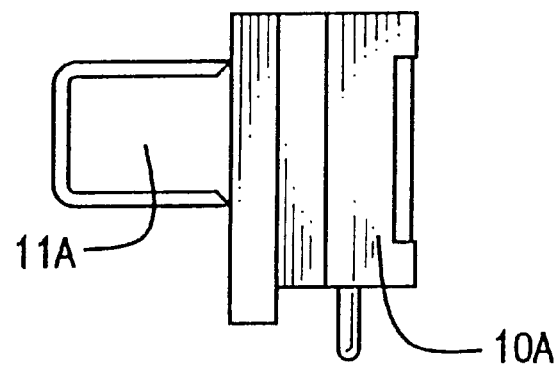
FIG. 3 is a side view of the header in FIG. 1.
Figure 4:
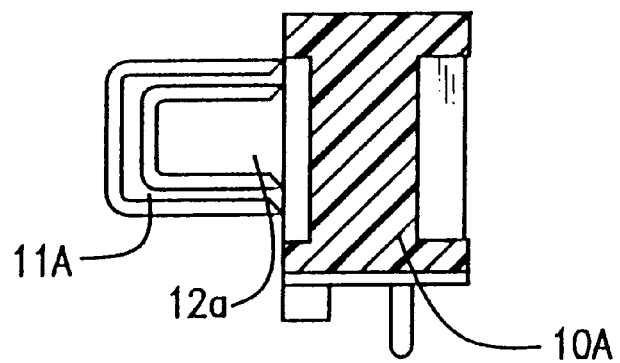
FIG. 4 is a longitudinal cross section view of the housing of header in FIG. 1.
Figure 5:
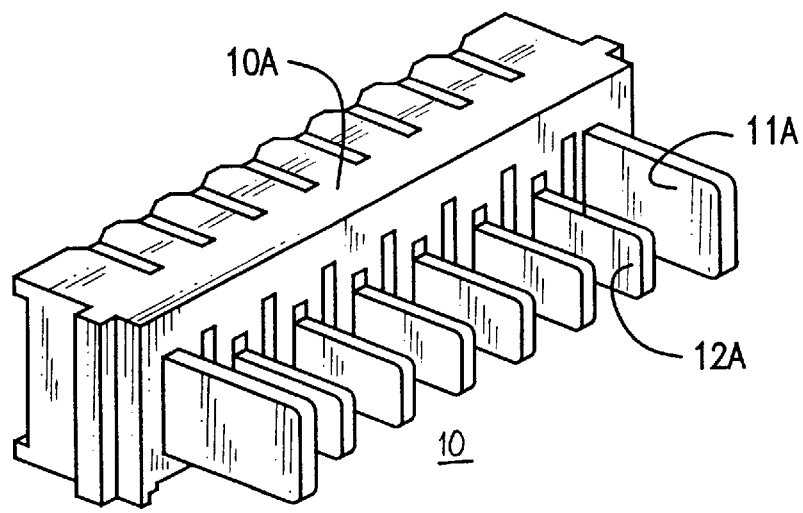
FIG. 5 is an oblique view of the header in FIG. 1.
Figure 6:
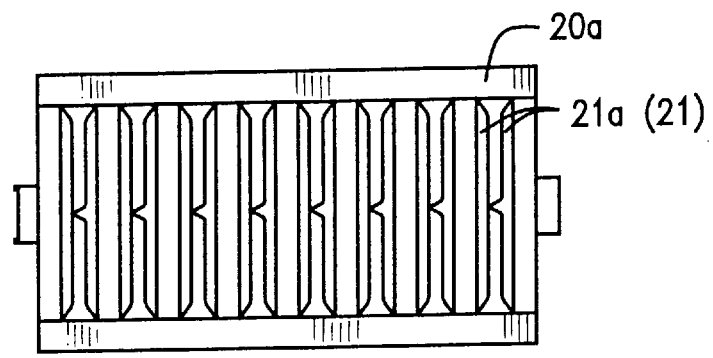
FIG. 6 is a front view of a connector socket as an application example of the present invention.
Figure 7:
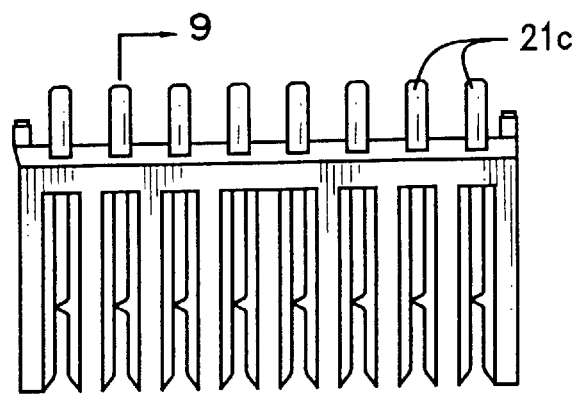
FIG. 7 is a plan view of the socket in FIG. 6.
Figure 8:
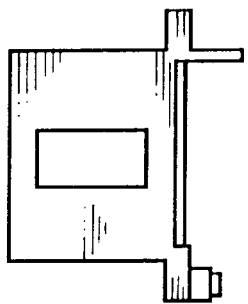
FIG. 8 is a side view of the socket in FIG. 6.
Figure 9:
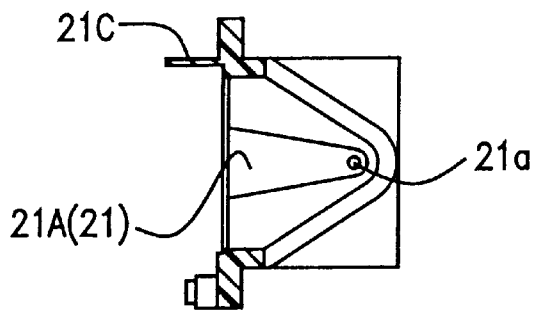
FIG. 9 is a longitudinal cross section view of the guide groove of the socket in FIG. 6.
Figure 10:
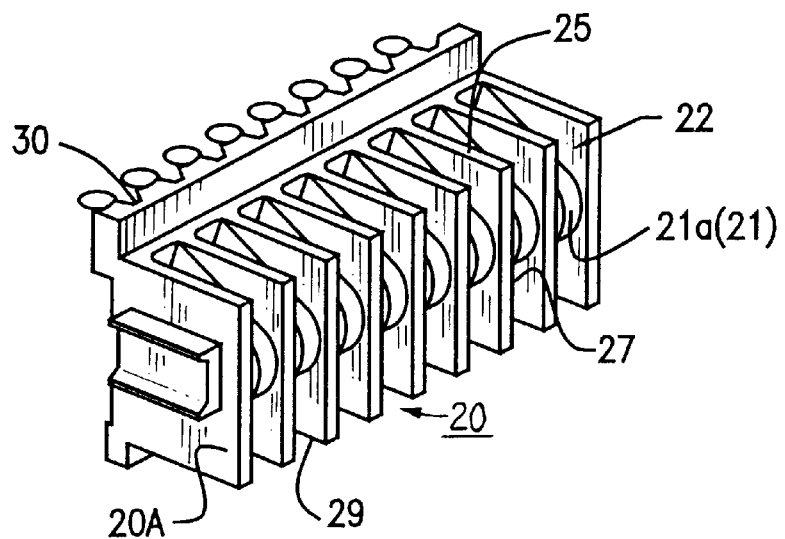
FIG. 10 is an oblique view of the socket in FIG. 6.

Furthermore, as is clear from FIG. 4, the housing has a nearly rectangular section.

Further, the post parts 11A at both ends of the header are longer than other post parts 12A and also are of wider width than the other post parts. The effect of this will be explained later.

Next, FIGS. 6–10 show sockets 20 of connectors of the present invention. The socket comprises a nearly rectangular housing 20A and multiple contacts 21 for electrical connection to the respective post parts of the header. Those contacts are mounted at a fixed interval along the longitudinal direction of the housing. Further, the contacts are installed inside the housing by removing the terminal leg parts 21C of the contacts so that the contacting parts 21A with the post parts of the header are not stretched out from the housing.

The socket further has multiple guide grooves 22 for receiving the respective post parts of the header and guiding them to the corresponding contacts of the socket. Those grooves are stretched to the adjoining three planes 25, 27, 29 of the housing of the socket (namely, the adjoining three planes of the housing are opened).

The contact of the socket comprises a pair of contact pieces 21A (refer to FIG. 6 and FIG. 9), terminal part 21C, and a connecting part (not shown in the figures) for connecting the contact pieces and the terminal parts. The contact pieces are mutually opposed to receive the post part of the header and also to squeeze the post part into the contact pieces as shown in the figures. Further, mutually opposing projections 21a are formed at the pair of contact pieces 21A, respectively.

Figure 11:
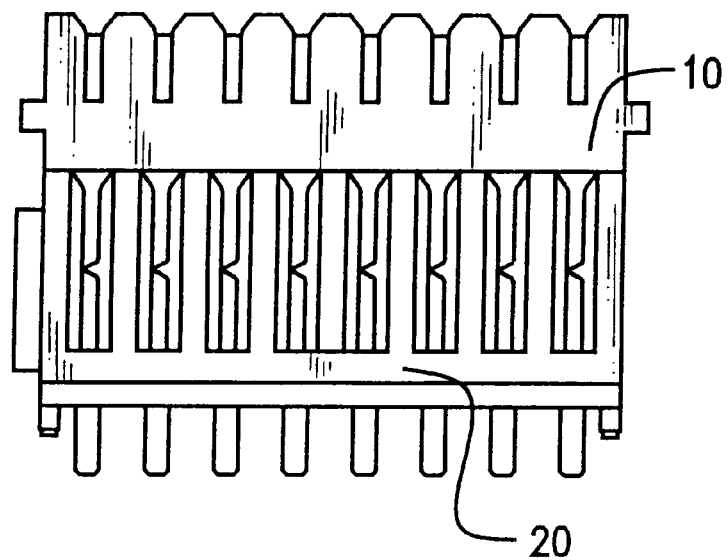
FIG. 11 is a plan view showing the coupled state of a socket and a header.
Figure 12:
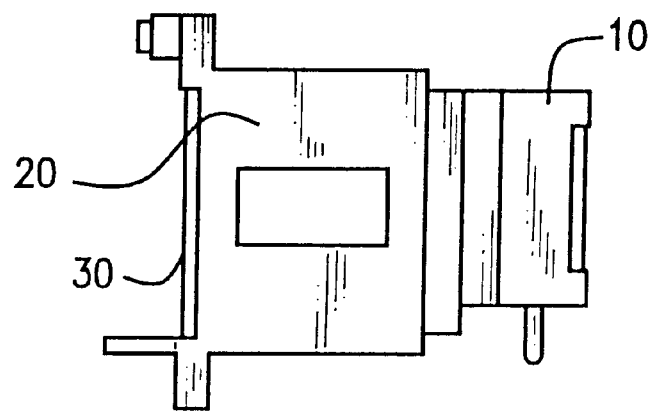
FIG. 12 is a side view showing the coupled state in FIG. 11.

FIGS. 11 and 12 show a connected state of the header and the socket. The post parts of the contacts of the header are passed through the guide grooves of the socket, received at the contact pieces of the socket and squeezed into the contact pieces to connect electrically both parts.

The socket is pre-attached at surface 30 to, for instance, a battery unit although it is not shown in the figure and the terminals of the contact is connected to the electrode of the unit. Further, the header is mounted on, for instance, printed boards through the leg part of the contact although it is not shown in the figure.

Since the guide grooves of the connector socket in the present invention are formed in such a manner to extend to the mutually adjoining three planes of the housing of the socket, it is possible to connect the post parts of the header to the contacts of the socket at a state in straight line form or mutually crossed form. Therefore, the freedom of connecting direction in connecting the header to the socket is large.

Since the post parts at both ends of the header are longer and wider than other post parts, the longer and wider post parts are first guided through the guide grooves of the socket to connect to opposite contacts, regardless of the connecting direction when the post parts are connected to the contacts of the socket. By this, both male and female connectors (socket and header) are smoothly inserted. Further, if the contacts having longer post parts are used as grounding terminals, the electrical safety is improved since the grounding terminals are first connected to the contacts of the socket.

Further, since the contacting part of the contacts of the socket with the post parts of the header is not exposed to the outside of the socket in the connector of the present invention, the contact point of the contact of the socket is not exposed to the outside of the housing regardless of the connection state of the socket and the header. Therefore, even when the socket is attached to, for instance, a unit having a large-capacity battery, the safety in handling is secured without short circuiting.

What is claimed is:

1. An electrical interconnection assembly comprising:

an elongate header having a plurality of spaced apart electrical header contacts extending from one surface thereof; and an elongate socket being of generally rectangular configuration having a mounting plane surface for attachment to an external component and supporting therein a plurality of spaced apart electrical socket contacts, said socket having guide groves therein which provide interconnection access to said socket contacts, said guide grooves extending to three plane surfaces thereof exclusive of said mounting plane surface, so as to provide interconnection access from three directions.

2. An interconnection assembly of claim 1 wherein said socket contacts include contact pieces for interconnection with said header contact, said contact pieces being supported within the guide grooves of the socket and are not exposed externally of the socket.

3. An interconnection assembly of claim 1 wherein said contact pieces include a pair of mutually opposed members for receiving said header contact.

4. An interconnection assembly of claim 3 wherein said header contacts include posts for insertion between said opposed members of said socket contact pieces.

5. An interconnection assembly of claim 1 wherein said header contacts include end contacts and an intermediate contacts and wherein said end contacts extend outwardly further than said intermediate contacts.

6. An interconnection assembly of claim 5 wherein said end contacts have a wider transverse extent than said intermediate contacts.

* * * * *